United States Patent
Dupire et al.

(10) Patent No.: US 6,723,795 B1
(45) Date of Patent: Apr. 20, 2004

(54) POLYPROPYLENE WITH HIGH MELT STRENGTH AND DRAWABILITY

(75) Inventors: Marc Dupire, Mons (BE); Jacques Michel, Feluy (BE)

(73) Assignee: ATOFINA Research S.A., Feluy (BE)

( * ) Notice: Subject to any disclaimer, the term of this patent is extended or adjusted under 35 U.S.C. 154(b) by 0 days.

(21) Appl. No.: 10/009,625

(22) PCT Filed: Jun. 8, 2000

(86) PCT No.: PCT/EP00/05397

§ 371 (c)(1),
(2), (4) Date: Mar. 29, 2002

(87) PCT Pub. No.: WO00/77090

PCT Pub. Date: Dec. 21, 2000

(30) Foreign Application Priority Data

Jun. 10, 1999 (EP) .............................. 99111318

(51) Int. Cl.⁷ ........................... C08L 23/00; C08L 23/04
(52) U.S. Cl. ........................................ 525/240
(58) Field of Search ........................... 525/240

(56) References Cited

U.S. PATENT DOCUMENTS

| 4,971,937 A | 11/1990 | Albizzati et al. |
| 4,975,403 A | 12/1990 | Ewen |
| 4,978,648 A | 12/1990 | Barbe et al. |
| 5,036,034 A | 7/1991 | Ewen |
| 5,095,153 A | 3/1992 | Agnes et al. |
| 5,494,965 A | * 2/1996 | Harlin et al. .................. 525/52 |
| 5,506,307 A | 4/1996 | Memon |
| 5,549,867 A | * 8/1996 | Gessner et al. ............. 264/555 |
| 5,578,682 A | * 11/1996 | White ........................ 525/282 |
| 5,786,403 A | * 7/1998 | Okada et al. ................ 521/134 |

FOREIGN PATENT DOCUMENTS

| EP | 045976 | 2/1982 |
| EP | 045977 | 2/1982 |
| EP | 0 310 734 | * 4/1989 |
| EP | 336128 | 10/1989 |
| EP | 399348 | 11/1990 |
| EP | 416566 | 3/1991 |
| EP | 0 942 013 A | * 9/1999 |
| WO | WO 99 07752 A | * 8/1996 |

OTHER PUBLICATIONS

Ghijsels, A., and De Clippeleir, J., "Melt Strength Behavior of Polypropylenes," Intern. Polymer Processing 1X., Hanser Publishers (Munich), p. 252–257, (1994).

* cited by examiner

Primary Examiner—Nathan M. Nutter
(74) Attorney, Agent, or Firm—William D. Jackson

(57) ABSTRACT

Use of a multimodal polypropylene blend in melt processing wherein for enhancing a compromise between melt strength and drawability the blend has a dispersion index of at least 8 and a ratio Mz/Mn of at least 10.

15 Claims, 3 Drawing Sheets

POLYPROPYLENE WITH HIGH MELT STRENGTH AND DRAWABILITY

The present invention relates to polypropylene.

Isotactic and syndiotactic polypropylene, and blends thereof, are known for use in a number of different applications. For example, polypropylene is used for the manufacture of spun fibres, blown films, extruded profiles and foams. In such applications in which the polypropylene is processed while molten, it is desirable for the polymer to have a high melt strength. For some applications, for example fibre spinning and film blowing, as well as having a high melt strength the polypropylene is required to have a high drawability. A high drawability not only enables the fibres or films to be produced at high speed without fracture, but also enables finer diameter fibres and thinner films to be manufactured.

There tends to be a compromise between high melt strength and drawability. Thus some known polypropylenes have high melt strength but low drawability. This makes them unsuitable for drawing fibres, particularly of small diameter.

A polymer melt having high melt strength at high shear rates refers to a melt that becomes stiffer and stronger when stretched, rather than one that thins out and breaks when stretched. This stiffening upon drawing is commonly called strain-hardening. Polypropylene processing operations where melt strength plays an important role include blow moulding, extrusion coating, thermoforming, fibre spinning and foam extrusion. In thermoforming, a poor melt strength results in a sagging phenomenon. In fibre spinning, a poor melt strength can result in undesired movements of the fibres due to transverse forces, for example by cooling air, which ultimately can lead to "married" fibres and fibre breakage. On the other hand, a too-high melt strength will limit the achievement of low titre fibres. Accordingly, a correct balance between melt strength and drawability is desirable. For blown (biaxially oriented) or cast films also, a correct balance between melt strength and stretchability is very important. In foam extrusion, a poor melt strength results in cell rupture and non-uniform cell structure. For such an application, a poor drawability will limit the fineness of the walls.

Several solutions have been proposed in the prior art to increase the melt strength of polypropylene. For example, polymers with long chain branching tend to exhibit good melt strength. For isotactic polypropylene, this can be achieved by irradiation or by reactive extrusion processes, such as disclosed in U.S. Pat. Nos. 5,047,446, 5,047,485 and 5,541,236. The limitation of these processes is the significant reduction of drawability occurring at the same time as melt strength increases. In addition, the irradiation process is expensive. It has also been proposed to blend isotactic polypropylene with additives, such as high molecular weight acrylates, to increase the melt strength, as disclosed for example in EP-A-0739938. The same results can be achieved by blending with isotactic polypropylene polyethylene having high melt strength or fillers. These processes are limited by the strong modification by the additives of the intrinsic properties of the isotactic polypropylene.

It is also known from the literature that the melt strength of isotactic polypropylene is solely determined by its weight average molecular weight (Mw) (A. Gijsels Ind. Polym. Process., 9, 252 (1994)).

U.S. Pat. No. 5,549,867 relates to a melt spinning process for polyolefin resins in which a blended resin includes a relatively small portion of a low molecular weight high melt flow rate narrow molecular weight distribution polyolefin resin with a larger portion of a miscible high molecular weight, low melt flow rate and typically narrow molecular weight distribution polyolefin resin. It is disclosed that the enhanced molecular weight distribution polyolefin blended resin has a variety of property parameters, including a molecular weight distribution breadth Mz/Mn of between 7.2 and 10, a flow rate ratio of less than 15.5 and a power law index at 20 seconds$^{-1}$ of between 0.70 and 0.78 and either a Z-average molecular weight Mz of between 400,000 and 580,000, or a second order constant $b_2$ determined from the regression analysis viscosity equation of between $-0.029$ and $-0.047$ or both, and unless both of the Mz and $b_2$ parameters is within said ranges, a die swell $B^2$ of between 1.6 and 2.0 and a spinnability factor ln $(B^2)$/MFR of between about 0.08 and about 0.026.

U.S. Pat. No. 5,494,965 discloses a process for manufacturing bimodal olefin polymers and copolymers. However, the specification does not address the problems of drawing polypropylenes.

U.S. Pat. No. 5,578,682 discloses the bimodalisation of a polymer molecular weight distribution by using grafting and scission agents.

EP-A-0310734 discloses catalyst systems for producing polyolefin having a broad molecular weight distribution, in particular a multimodal molecular weight distribution. This specification does not address the problems of drawability of polypropylenes.

It is an aim of the present invention to provide polypropylene, which may be isotactic, syndiotactic or a blend of isotactic and syndiotactic fractions, which provides improved properties such as melt strength and drawability. It is also an aim of the present invention to provide such polypropylene which can be used in processing applications which require the polypropylene to be processed from the melt, for example at high shear rates, typically in fibre spinning. It is a further aim of the present invention to provide polypropylene which has an improved compromise between melt strength and drawability.

Accordingly the present invention provides the use of a multimodal isotactic polypropylene blend in melt processing wherein for enhancing a compromise between melt strength and drawability the blend has a dispersion index of at least 8 and a ratio Mz/Mn of at least 10.

The present invention also provides a method of enhancing a compromise between melt strength and drawability in melt processing of a polypropylene, the process including providing a multimodal polypropylene blend having a dispersion index of at least 8 and a ratio Mz/Mn of at least 10.

The present invention further provides a method of melt processing a polypropylene blend, the method comprising providing a multimodal polypropylene blend, selecting the blend to have a dispersion index of from 8 to 70 and a ratio Mz/Mn of at least 10 thereby enhancing a compromise between melt strength and drawability, and processing the blend in the melt by drawing the blend to form a solid product.

In this specification, the dispersion index (D) (also known as the polydispersity index) is the ratio between the weight average molecular weight (Mw) and the number average molecular weight (Mn). The ratio Mz/Mn is the molecular weight distribution breadth. Mz is the z-average molecular weight, defined as $\Sigma NiMi^3/\Sigma NiMi^2$ over all i.

The multimodal blend is preferably bimodal, but may alternatively be trimodal, tetramodal, etc. The blend of the fractions may be obtained by physical blending or chemical blending, for example chemical blending using two reactors in series or chemical blending using one reactor with specific dual-type catalysts. The polypropylene fractions may be composed of homopolymer or copolymer and may be made using differing catalysts, for example Ziegler-Natta catalysts or metallocene catalysts.

Preferably, the dispersion index is greater than 15. The dispersion index may be up to about 70.

The molecular weight distribution breadth is not especially limited, provided that it is 10 or above. Preferably, the molecular weight distribution breadth (Mz/Mn) is from 50–150.

The blend may comprise from 20 to 80 wt % of a first high molecular weight fraction and from 80 to 20 wt % of a second low molecular weight fraction.

Preferably, the blend comprises from 50 to 70 wt % of the first fraction and from 50 to 30 wt % of the second fraction. More preferably, the blend comprises from 55 to 65 wt % of the first fraction and from 45 to 35 wt % of the second fraction.

Preferably, the ratio of the melt flow indexes of the first and second fractions is at least 5. Typically, the first fraction has a melt flow index of less than 5 dg/min and the second fraction has a melt flow index of from 60 to 1000 dg/min.

Optionally, the blend has been formed by reactive extrusion of a mixture of the first and second fractions together with a mixture of a chain scission agent and a chain grafting agent. The chain scission agent may comprise 2,5-dimethyl-2,5-di(tert-butylperoxy) hexane. The chain grafting agent may be selected from allyl methacrylate and divinyl benzene.

The first and second fractions, and the blend, are preferably comprised of polypropylene homopolymer. Alternatively, the first and/or second fractions may se comprised of polypropylene copolymer.

The present invention also relates to the use of the polypropylene for forming fibres, foams, films, thermoformed articles and extruded products.

The present invention is predicated on the discovery by the inventors that the mechanical properties, in particular the melt strength and drawability of polypropylene can be improved by increasing the molecular weight distribution of the multimodal polypropylene by providing a high dispersion index (D), which is the ratio Mw/Mn (where Mw is the weight average molecular weight and Mn is the number average molecular weight). The melt strength is typically measured by measuring the force required in order to pull a fibre from an extruded melt onto a rotating wheel under given conditions. A polypropylene having higher melt strength is generally more reliably processed from the melt, for example in the spinning of fibres, in the blowing of films, in thermoforming, and in the extrusion of profiles, such as tubes or pipes. Generally, as the melt strength increases, the tendency for the molten material to break or deform decreases.

The melt strength tends to increase with a decrease in the melt flow index (MFI) of the polypropylene. In this specification, the MFI values are determined using the procedures of ASTM D1238 using a load of 2.16 kg at a temperature of 230° C.

As well as having high melt strength, it is desired for fibre spinning (and film blowing) that the polypropylene has a high drawability. A high drawability represents the ability of the material to be stretched into a small diameter fibre (or a thin film) at high speed, i.e. at high strain rates. Typically, the drawability of the polypropylene is determined by wrapping a fibre around a wheel rotating at constant acceleration during spinning of the fibre and measuring the maximum angular speed, in units of revolutions per minute, up to rupture of the filament. With increasing drawability, the speed of drawing can increase prior to rupture, thereby enabling even finer filaments to be manufactured.

Thus the present inventors have found that by providing a polypropylene blend with a dispersion index of at least 8, the melt strength and drawability together can be sufficiently high to yield a good compromise between them, enabling the blend to have particularly advantageous application for fibre spinning.

Figure 1:
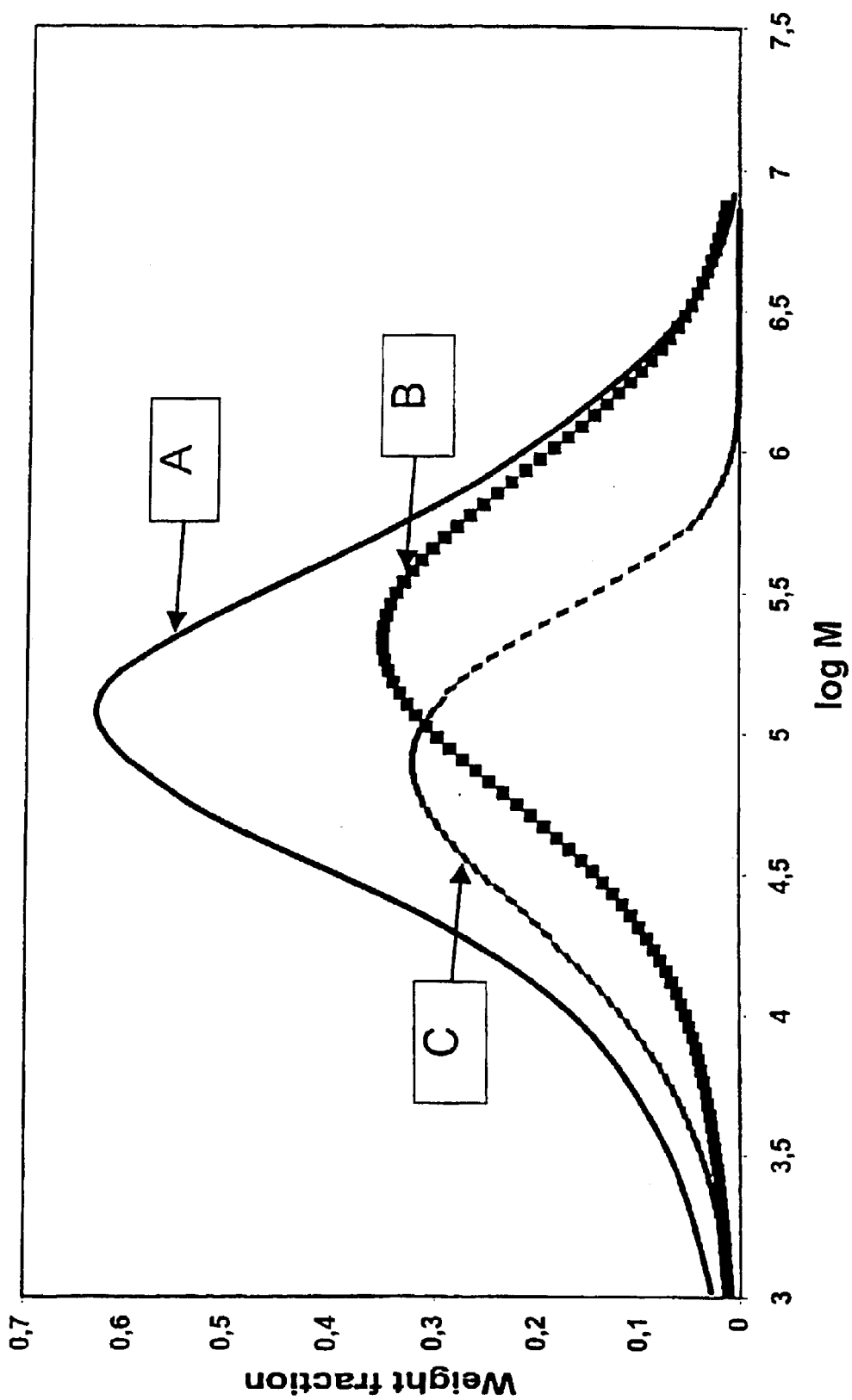
FIG. 1 is a gel-permutation chromatogram of a bimodal isotactic polypropylene having a melt flow index of 11.5 dg/min.
Figure 2:
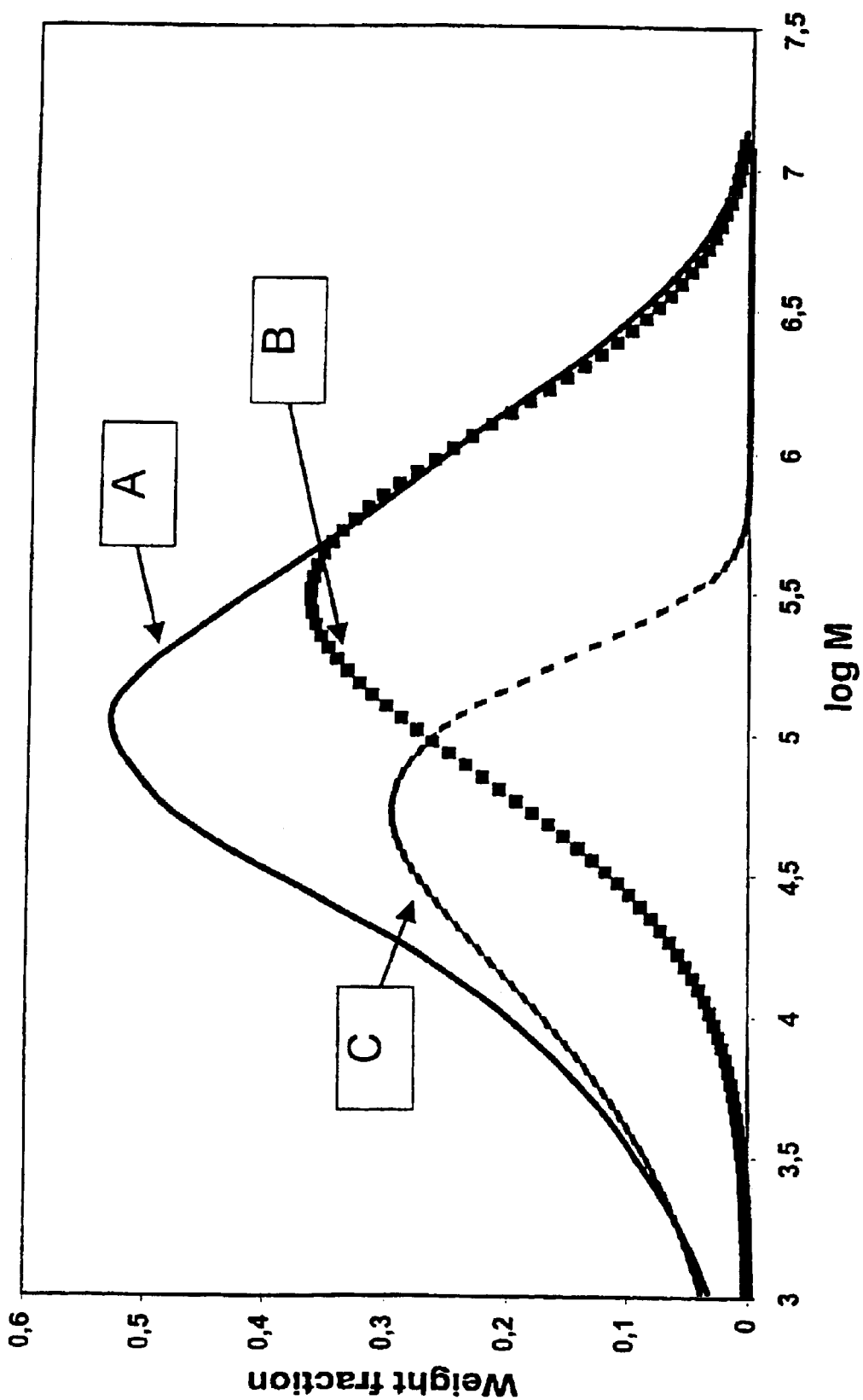
FIG. 2 is a gel-permutation chromatogram of a bimodal polypropylene having a melt flow index of 6.9 dg/min.
Figure 3:
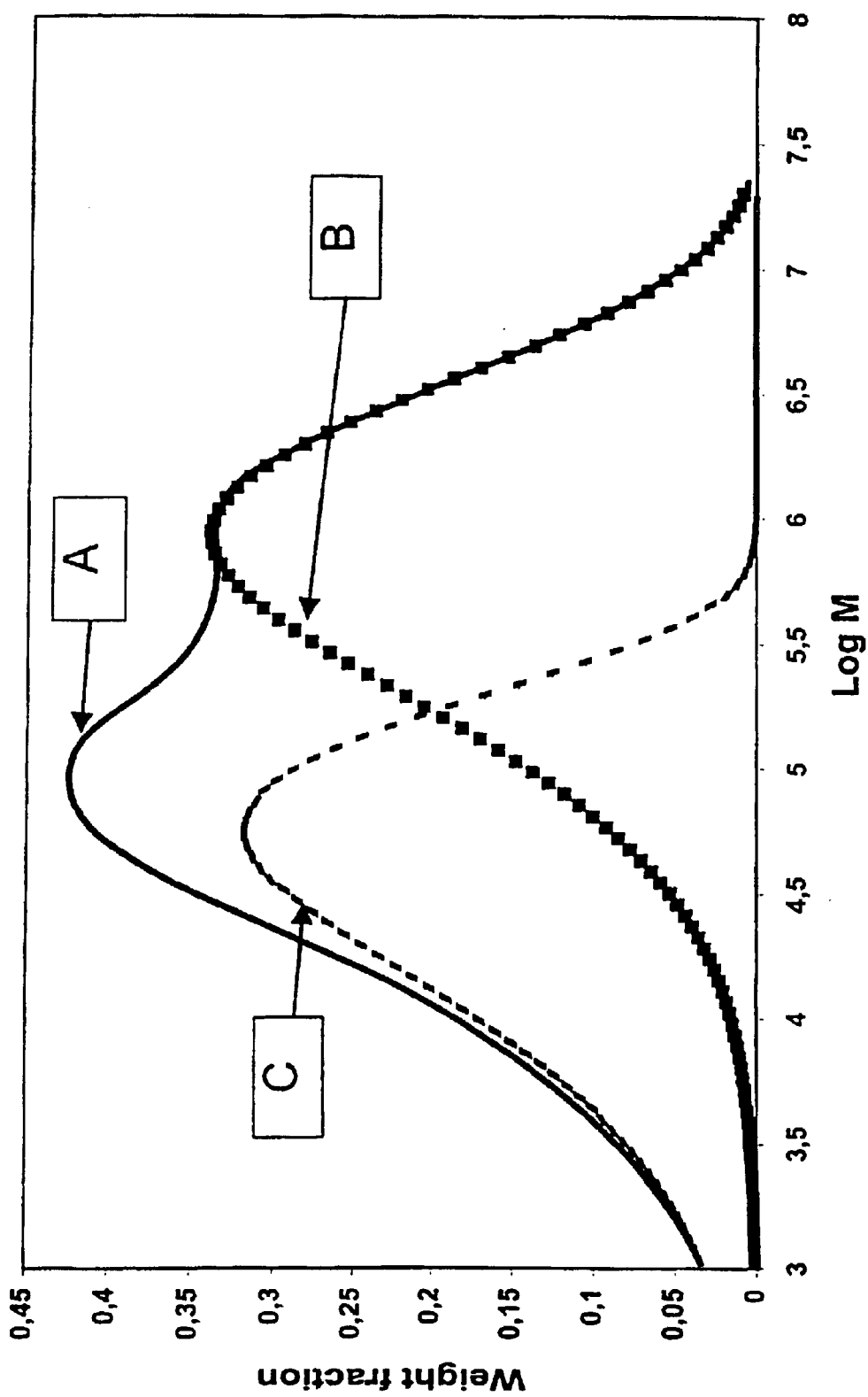
FIG. 3 is a gel-permutation chromatogram of a bimodal polypropylene having a melt flow index of 1.1 dg/min.

The present invention will now be described by way of example only, with reference to the accompanying drawings, in which: FIGS. 1 to 3 are gel permeation chromatograms (GPCs) of isotactic polypropylene resins in accordance with three different embodiments of the invention.

Referring to FIG. 1, there is shown a GPC chromatogram of a bimodal isotactic polypropylene in accordance with a first embodiment of the present invention. The bimodal isotactic polypropylene has a melt flow index of 11.5 dg/min. The molecular weight distribution (A) of the bimodal isotactic polypropylene is such that Mw is 279 kDa, Mn is 30 kDa and the dispersion index is accordingly 9.3. The bimodal isotactic polypropylene is formed as a physical blend of two isotactic polypropylene homopolymer fractions. The first fraction is a high molecular weight fraction (B) having an MFI of 2.3 dg/min and comprising 55 wt % of the bimodal isotactic polypropylene. The second fraction is a low molecular weight (C) fraction having an MFI of 72 dg/min and comprising 45 wt % of the bimodal isotactic polypropylene. The high molecular weight fraction has an Mw of 419 kDa, an Mn of 49 kDa and a dispersion index of 8.6, and the low molecular weight fraction has an Mw of 146 kDa, an Mn of 21 kDa and a dispersion index of 7.0.

FIG. 2 is a GPC chromatogram of a bimodal isotactic polypropylene in accordance with a second embodiment of the present invention. The bimodal isotactic polypropylene has a melt flow index of 6.9 dg/min. The molecular weight distribution (A) of the bimodal isotactic polypropylene is such that Mw is 363 kDa, Mn is 26 kDa and the dispersion index is accordingly 14.1. The bimodal isotactic polypropylene is formed as a physical blend of two isotactic polypropylene homopolymer fractions, the first being a high molecular weight fraction (B) having an MFI of 0.8 dg/min and comprising 57 wt % of the bimodal isotactic polypropylene, and the second being a low molecular weight fraction having an MFI of 350 dg/min and comprising 43 wt % of the bimodal isotactic polypropylene. The high molecular weight fraction has an Mw of 568 kDa, an Mn of 73 kDa and a dispersion index of 7.8, and the low molecular weight fraction (C) has an Mw of 99 kDa, an Mn of 16 kDa and a dispersion index of 6.2.

FIG. 3 is a GPC chromatogram of a bimodal isotactic polypropylene in accordance with a third embodiment of the present invention. The bimodal isotactic polypropylene has a melt flow index of 1.1 dg/min. The molecular weight distribution (A) of the bimodal isotactic polypropylene is such that Mw is 671 kDa, Mn is 27 kDa and the dispersion index is accordingly 24.9. The bimodal isotactic polypropylene is formed as a physical blend of two isotactic polypropylene homopolymer fractions, the first being a high molecular weight fraction (B) having an MFI of 0.06 dg/min and comprising 55 wt % of the bimodal isotactic polypropylene, and the second being a low molecular weight fraction (C) having an MFI of 450 dg/min and comprising 45 wt % of the bimodal isotactic polypropylene. The high molecular weight fraction has an Mw of 1460 kDa, an Mn of 142 kDa and a dispersion index of 10.2, and the low molecular weight fraction has an Mw of 95 kDa, an Mn of 15 kDa and a dispersion index of 6.3.

It may be seen for FIGS. 1 to 3 that in accordance with the embodiments of the invention, each bimodal isotactic polypropylene blend is composed of two initial isotactic polypropylene fractions. The fractions are selected so as to provide a minimum dispersion index (D) of 8 in the bimodal isotactic polypropylene blend. The dispersion index D may be up to about 70 for blends in accordance with the invention. The fractions are also selected so as to have specific respective melt flow indexes, thereby to provide a melt flow index differential between the two fractions, to provide the required minimum dispersion index in the ultimate blend. In this way, the molecular weight distribution of the blend is broadened, which has been found by the inventors to provide increased melt strength at any given melt flow index for the blend. In addition, as the melt flow index of the blend increases, this also tends to decrease the melt strength.

In the blending operation using reactive extrusion, a mixture of a chain scission agent and a chain grafting agent may be employed.

The chain scission agent may for example comprise a peroxide compound, typically 2,5-dimethyl-2,5-di(tert-butylperoxy) hexane. The use of such a chain scission agent combined with a grafting agent tends to increase the degree of branching of the molecules in the high molecular weight fraction, thereby increasing the molecular weight distribution of the ultimate polypropylene, thereby in turn yet further increasing the melt strength.

The grafting agent may be a bi- or multifunctional grafting agent, typically allyl methacrylate or divinyl benzene. The grafting agent promotes cross-linking of the branches formed by the chain scission agent. This increases the melt strength but tends to reduce the drawability or spinnability of the polypropylene.

Typically, the extrusion temperature is around 220° C. When a chain scission agent such as 2,5-dimethyl-2,5-di (tert-butylperoxy) hexane is employed, this is employed in an amount of around 55 ppm based on t he weight of the blend. When a grafting agent is employed, such as allyl methacrylate, this is typically employed in an amount of around 750 ppm based on the weight of the blend.

The flexural modulus of the polypropylenes is a complex function depending upon several parameters, not only the dispersion index D but also for example the melt flow index, the xylene solubles and the crystallinity of the polymer. The present inventors have also found that the flexural modulus E of the polypropylenes in accordance with the invention tends to increase with increasing dispersion index at constant melt flow index and xylene solubles.

Preferably, the isotactic polypropylenes of the present invention are produced with Ziegler-Natta catalysts using a phthalate as an external electron donor, see for example EP-A-0045976, EP-A-0045977 and U.S. Pat. No. 4,544, 171. The phthalate may be replaced by a 1,3 diether compound, see for example U.S. Pat. Nos. 4,971,937, 4,978, 648 and 5,095,153. The isotactic polypropylene can also be produced with metallocene catalysts, see for example EP-A-0416566, EP-A-0399348 and EP-A-0336128. The invention also applies to syndiotactic polypropylene, or to a blend of isotactic and syndiotactic polypropylene obtained by physical mixing or chemical mixing using for example a metallocene catalyst, as disclosed for example in U.S. Pat. No. 5,036,034. In addition, the polypropylene may be treated with a nucleating agent, typically lithium benzoate, for nucleation of crystallites in the polypropylene.

The polypropylene may be a homopolymer, a random copolymer containing ethylene and a higher alpha-olefin, or a heterophasic block copolymer of ethylene and a higher alpha-olefin.

The present invention will now be described further with reference to the following non-limiting Examples.

EXAMPLES 1 to 4

For each of Examples 1 to 4, a bimodal isotactic polypropylene blend was produced by blending together a high molecular weight component and a low molecular weight component in a screw extrusion apparatus operated under nitrogen gas at a temperature of around 220°C. Table 1 specifies the composition and properties for both the high molecular weight and low molecular weight components, and the ultimate blend for each of Examples 1 to 4. The molecular weight distributions of the blends and components of Examples 2 and 4 are shown respectively in FIGS. 2 and 3.

For each of Examples 1 to 4, the melt strength was tested by measuring the force for a fibre which is pulled from a melt. In this specification the melt strength was determined in a laboratory using a CEAST rheometer (Rheoscope 1000) equipped with a capillary die and a rotating wheel as a take up device. With this set up, molten polymer is extruded by application of a pressure resulting from the displacement of a piston. The molten extrudate is uniaxially stretched before crystallisation by wrapping the fibre around the rotating wheel. In this test, the piston displacement rate is fixed, and the speed of the rotation take-up wheel is linearly changed, i.e. with constant acceleration, until the fibre, becoming very thin, breaks. The tensile force is recorded during the test. The melt strength is defined as the maximum tensile force corresponding to the breaking of the fibre. The tests were run under standard conditions as follows: the cylindrical die had a length/diameter ratio of 5 mm to 1 mm; the diameter of the rotating wheel was 12 cm; the extrusion temperature was 250° C.; the displacement ratio of the piston was 2 mm/min, the extrudate throughput was 2.36 mm$^3$/min and the acceleration of the rotating wheel was 10 rpm/100s or 0.000628 m/s$^2$. The drawability is defined as the titre at break under the same conditions. The correspondence between the angular speed of the wheel (V) expressed in rpm and the titre (expressed in denier) is the following: titre at break=3384.4 ρ/V where ρ is the polymer density at 250° C. The results are also specified in Table 1.

It may be seen for each of Examples 1 to 4 that the dispersion index D, which is the ratio Mw/Mn, is greater than 8 and the melt flow index varies from 1.1 to 6.9 dg/min. The melt strength varied from 2.8 mN to 15.5 mN. In combination with the melt strength values, the drawability of the polymers of each of Examples 1 to 4 is high, the filament breaking at least 260 rpm at a temperature of 250° C.

COMPARATIVE EXAMPLE 1

As a comparison, the corresponding properties of a commercially available isotactic polypropylene resin with a high degree of long chain branching were tested. The resin is sold under the trade name Profax PF814 by the company Montell North America Inc. of Wilmington, Del., USA. It may seen that while the resin of Comparative Example 1 had a very high melt strength, being around 3 times that of the maximum melt strength of Examples 1 to 4, particularly for that of Example 4, nevertheless the drawability of the commercial resin was very low, with the filament breaking at a speed of only 9 rpm at 250° C.

COMPARATIVE EXAMPLE 2

As a further comparison, the corresponding properties of a monomodal polypropylene resin were tested and the results are shown in Table 1.

Table 1 shows that the multimodal polypropylene resins in accordance with the invention have a good compromise between high melt strength and high drawability. This is achieved by for example a blend of high and low molecular weight components having a high dispersion index of at least 8. This makes the resins of the invention particularly suitable for fibre spinning and film blowing. The resins of the invention also have utility in lower shear rate processes, such as the formation of films and in extrusion forming processes. The multimodal polypropylene in accordance with the invention can be stretched more than the high melt strength polypropylene with long chain branching of Comparative Example 1. The propylene of the Examples had a higher drawability than the polypropylene of Comparative Example 2. Thus the present invention provides polypropylene blends having an improved compromise of high melt strength and extensibility in the melt.

5. A method according to claim 1 wherein the blend comprises from 55 to 60 wt. % of the first fraction and from 45 to 35 wt. % of the second fraction.

6. A method of melt processing a polypropylene blend, the method comprising providing a multimodal polypropylene blend in a molten state, said blend having a melt dispersion index of from 8 to 70 and a ratio $Mz/Mn$ of at least 10 thereby enhancing a compromise between melt strength and drawability, and processing the blend in the melt by drawing and cooling the blend to form a solid product wherein the blend has been formed by reactive extrusion of a mixture of at least two fractions together with a mixture of a chain scission agent and a chain grafting agent.

7. A method according to claim 6 wherein the chain scission agent comprises 2,5-dimethyl-2,5-di(tert-butylperoxy) hexane.

8. A method according to claim 6 wherein the chain grafting agent is selected from the group consisting of allyl methacrylate and divinyl benzene.

9. A polypropylene blend useful in melt processing and providing for enhancing a compromise between melt strength and drawability, said blend having a dispersion index of at least 8 and a ratio $Mz/Mn$ of at least 10, wherein the blend is bimodal and comprises from 50 to 70 wt. % of a first high molecular weight fraction and from 50 to 30 wt. % of a second low molecular weight fraction.

10. A multimodal polypropylene blend according to claim 9 wherein the ratio of the melt flow indexes of the first and second fractions is at least 5.

11. A multimodal polypropylene blend according to claim 9 wherein the blend comprises from 55 to 65 wt. % of the first fraction and from 45 to 35 wt. % of the second fraction.

TABLE 1

| | High Mw component | | | Low Mw component | | | Blend | | | | | | | |
|---|---|---|---|---|---|---|---|---|---|---|---|---|---|---|
| | wt % | MFI (dg/min) | D | wt % | MFI (dg/min) | D | MFI (dg/min) | D (Mw/Mn) | Melt strength (mN) | Drawability (rpm) | Mn (kDa) | Mw (kDa) | Mz (kDa) | Mz/Mn |
| Example 1 | 65 | 0.8 | 7.8 | 35 | 63 | 6.2 | 2.9 | 10.1 | 4.4 | >300 | 44.7 | 453 | 2313 | 51.7 |
| Example 2 | 57 | 0.8 | 7.8 | 43 | 350 | 6.2 | 6.9 | 14.1 | 3.0 | >300 | 25.7 | 363 | 2255 | 87.7 |
| Example 3 | 65 | 1.6 | 7.1 | 35 | 450 | 6.3 | 6.9 | 10.8 | 2.8 | >300 | 31 | 336 | 1651 | 53.3 |
| Example 4 | 55 | 0.06 | 10.2 | 45 | 450 | 6.3 | 1.1 | 24.9 | 15.5 | 260 | 27 | 671 | 4057 | 150.3 |
| Comparative Example 1 | — | — | — | — | — | — | 3.0 | 9.2 | 52 | 9 | 44.1 | 404 | 1680 | 38.1 |
| Comparative Example 2 | — | — | — | — | — | — | 1.0 | 7.2 | 8 | 240 | | | | |

What is claimed is:

1. A method of melt processing a polypropylene blend, the method comprising providing a bimodal polypropylene blend in a molten state, said blend comprising from 50 to 70 wt % of a first high molecular weight fraction and from 50 to 30 wt. % of a second low molecular weight fraction and having a melt dispersion index of from 8 to 70 and a ratio $Mz/Mn$ of at least 10 thereby enhancing a compromised between melt strength and drawability, and processing the blend in the melt by drawing and cooling the blend to form a solid product.

2. A method according to claim 1 wherein the dispersion index is greater than 15.

3. A method according to claim 1 wherein the ratio of $Mz/Mn$ is from 50–150.

4. A method according to claim 3 wherein the dispersion index is greater than 15.

12. A multimodal polypropylene blend according to claim 11 wherein the ratio of the melt flow indexes of the first and second fractions is at least 5.

13. A multimodal polypropylene blend useful in melt processing and providing for enhancing a compromise between melt strength and drawability, said blend having a dispersion index greater than 15 and a ratio $Mz/Mn$ of a least 10.

14. A multimodal polypropylene blend useful in melt processing and providing for enhancing a compromise between melt strength and drawability, said blend having a dispersion index of at least 8 and a ratio $Mz/Mn$ of from 50–150.

15. A multimodal polypropylene blend according to claim 14 wherein the dispersion index is greater than 15.

* * * * *